(12) United States Patent
Hall

(10) Patent No.: US 8,386,704 B2
(45) Date of Patent: Feb. 26, 2013

(54) TECHNIQUES FOR IMPROVING HARD DISK DRIVE EFFICIENCY

(75) Inventor: David Robison Hall, Rochester, MN (US)

(73) Assignee: HGST Netherlands B.V., Amsterdam (NL)

( * ) Notice: Subject to any disclaimer, the term of this patent is extended or adjusted under 35 U.S.C. 154(b) by 965 days.

(21) Appl. No.: 11/552,888

(22) Filed: Oct. 25, 2006

(65) Prior Publication Data

US 2008/0104315 A1    May 1, 2008

(51) Int. Cl.
   *G06F 12/00* (2006.01)
   *G06F 13/00* (2006.01)
   *G06F 13/28* (2006.01)

(52) U.S. Cl. ......... 711/112; 711/154; 712/244; 710/260

(58) Field of Classification Search .................. 711/112, 711/154; 712/244; 710/260
   See application file for complete search history.

(56) References Cited

U.S. PATENT DOCUMENTS

| | | | |
|---|---|---|---|
| 5,063,498 A * | 11/1991 | Hirahara et al. ................. | 710/50 |
| 5,995,745 A | 11/1999 | Yodaiken | |
| 6,378,037 B1 | 4/2002 | Hall | |
| 6,578,107 B1 | 6/2003 | Anderson et al. | |
| 6,640,258 B2 | 10/2003 | Espeseth et al. | |
| 6,763,404 B2 | 7/2004 | Berning et al. | |
| 6,823,398 B1 | 11/2004 | Lee et al. | |
| 6,870,887 B2 | 3/2005 | Kauffman et al. | |
| 6,877,070 B2 | 4/2005 | Espeseth et al. | |
| 6,925,526 B2 | 8/2005 | Hall | |
| 7,024,614 B1 | 4/2006 | Thelin et al. | |
| 7,082,494 B1 * | 7/2006 | Thelin et al. ................... | 711/112 |
| 7,434,222 B2 * | 10/2008 | Reid .............................. | 718/107 |
| 2002/0156939 A1 * | 10/2002 | Armstrong et al. ........... | 709/400 |
| 2003/0053240 A1 | 3/2003 | Bruner et al. | |
| 2003/0217065 A1 * | 11/2003 | Yokota .......................... | 707/100 |
| 2004/0190175 A1 | 9/2004 | Chey et al. | |
| 2004/0199711 A1 | 10/2004 | Byers et al. | |
| 2005/0094316 A1 | 5/2005 | Shiramatsu et al. | |
| 2005/0105204 A1 | 5/2005 | Bloodworth et al. | |
| 2005/0166015 A1 | 7/2005 | Bruner et al. | |

FOREIGN PATENT DOCUMENTS

WO    WO 01/75566    10/2001

OTHER PUBLICATIONS

European Patent Office, European Search Report and Search Opinion for European patent application EP 07013733.6, Oct. 17, 2008.
European Patent Office, European Search Report and Search Opinion for European patent application EP 07 00 7191.5, Jun. 5, 2008.
U.S. Appl. No. 11/200,284, filed Aug. 8, 2005, Wilson et al.
"The Advantages of Object-Based Storage—Secure, Scalable, Dynamic Storage Devices," Seagate Research, Apr. 2005, pp. 1-7.
"Metadata," Wikipedia, the free encyclopedia, Oct. 25, 2006, pp. 1-11.

* cited by examiner

*Primary Examiner* — Stephen Elmore
*Assistant Examiner* — Mark Giardino, Jr.
(74) *Attorney, Agent, or Firm* — Steven J. Cahill

(57) ABSTRACT

A host operating system (OS) can function as a task under a disk drive operating system. The host OS and the disk drive operating system can be run on a single processor. The processor is able to maintain the real-time response characteristics of a disk drive controller. A shared memory subsystem can be accessed by both operating systems. A disk drive storage device can access and respond to metadata about an underlying file system maintained by a host operating system (OS) to optimize data transfers between the disk drive and the host OS. The disk drive can identify the nature of read/write accesses, allowing it to prioritize and performance optimize the accesses. The disk drive can perform these functions without any changes to the block interface.

16 Claims, 7 Drawing Sheets

TECHNIQUES FOR IMPROVING HARD DISK DRIVE EFFICIENCY

BACKGROUND OF THE INVENTION

The present invention relates to disk drives, and more particularly, to techniques for improving the efficiency of hard disk drives.

When a host operating system sends a read or write request to a storage device, the requesting task within the operating system (OS) blocks until the request is completed. In a desktop environment, there are typically other tasks that can be performed during the request operation.

However, embedded devices typically only perform one function at a time. In an embedded device with integrated drive storage, the processor that runs the host OS is idle during disk drive operations. Conversely, a disk drive controller processor also has significant idle periods.

Most disk drive controller processor designs stress response time versus total bandwidth. According to standard design criteria, more emphasis is placed on having a disk drive controller processor quickly finish its processing once a command is received. For example, standard design criteria places more importance on starting the movement of an actuator in a disk drive, than on maximizing the total amount of processing that can be done over time. As a result, disk drive controller processors have a significant amount of processor bandwidth that is unused.

There is very little overlap between when a host OS processor is operating and when a disk drive controller is operating in the environment of a typical embedded device. Therefore, it would be desirable to increase the efficiency of data transfers between the host OS and the disk drive controller to provide a cost and performance advantage.

In storage devices where data is accessed via block addresses, the storage device has no knowledge of the nature of any given read/write access. From the storage device's point of view, all accesses are created equal. The real-time nature of video and audio requires steady data rates with very low jitter.

In many of these systems, other accesses to the storage device are occurring at the same time. As an example, a set top box can play a movie at the same time that a user is browsing a channel guide. The requirements of the movie are real-time, while the channel guide is not. Because the storage device is oblivious to these requirements, the system has to be engineered to work around this limitation, often leading to additional system cost or a lower level of performance.

The attempts that have been made to address this limitation have failed to be adopted in the marketplace, because either significant cost was added to the storage device, or the protocol for the system/storage device communication required significant changes to the standards.

Therefore, it would be desirable to provide a technique for making a disk drive storage device provide multiple streams of audio and/or video without requiring significant extra cost or significant changes to the system or the storage device communication protocol.

BRIEF SUMMARY OF THE INVENTION

According to some embodiments of the present invention, a host operating system (OS) functions as a task under a disk drive operating system. The host OS and the disk drive operating system can be run on a single processor, according to further embodiments. The processor is able to maintain the real time response characteristics of a disk drive controller.

The present invention provides a unique interface between the host OS and the disk drive that minimizes changes to the host OS. An additional embodiment of the present invention provides a shared memory subsystem that can be accessed by both operating systems.

According to other embodiments of the present invention, a disk drive storage device can access and respond to metadata about an underlying file system maintained by a host operating system (OS) to optimize data transfers between the disk drive and the host OS. The disk drive can identify the nature of read and write accesses, allowing it to prioritize and performance optimize the accesses. The disk drive can perform these functions without any changes to the block interface. As a result, a disk drive of the present invention can be a drop-in replacement in existing systems.

Other objects, features, and advantages of the present invention will become apparent upon consideration of the following detailed description and the accompanying drawings.

DETAILED DESCRIPTION OF THE INVENTION

A Host Operating System (OS) Implemented as a Task Under a Disk Drive (OS)

In general, computing systems include a host operating system (OS) and a disk drive operating system for a disk drive. The host OS issues requests for logical block addresses (LBAs) to the disk drive operating system to read and/or write data to/from a magnetic hard disk. The requests from the host OS are also referred to herein as read/write requests or LBA requests. The disk drive operating system converts the read/write requests into read/commands that are executed to read and write data from the disk using the mechanical parts of the disk drive (e.g., the actuator arm and the read/write head).

The functions of a disk drive operating system and a host operating system (OS) could be combined by implementing the disk drive operations under the host OS. Assuming the host OS is not a real time operating system (RTOS), this approach would result in nondeterministic behavior in response time for the disk drive functions. The resultant behavior would degrade drive performance and could lead to instability in environments where servo control is done on the same processor.

Instead, embodiments of the present invention provide a pseudo-virtual machine to the host OS as a task in disk drive operating system. The host OS task runs at a priority level lower than the real-time tasks in the system. This technique allows the host OS to be interrupted when a higher priority task is ready to run, typically in response to a processor interrupt. The traditional roles of the host OS and the disk drive operating system, where the host OS is the master controller, are reversed. A host OS of the present invention can perform all of the host functions, including, for example, issuing read and write requests to the disk drive operating system, performing user interface functions, managing the interaction of user software applications and hardware, controlling and allocating memory, prioritizing the processing of instructions, controlling input and output devices, facilitating networking, and managing files.

The present invention allows for multiple host operating systems to run under the disk drive operating system, which may have significant advantages for secure applications. The disk drive operating system and the host OS can be run on a shared processor, or on separate processors.

A disk drive operating system is described herein primarily in the context of a real-time operating system (RTOS) for a disk drive in an embedded device. However, it should be understood that the principles of the present invention can be applied to disk drive operating systems other than real-time operating systems.

Figure 1:
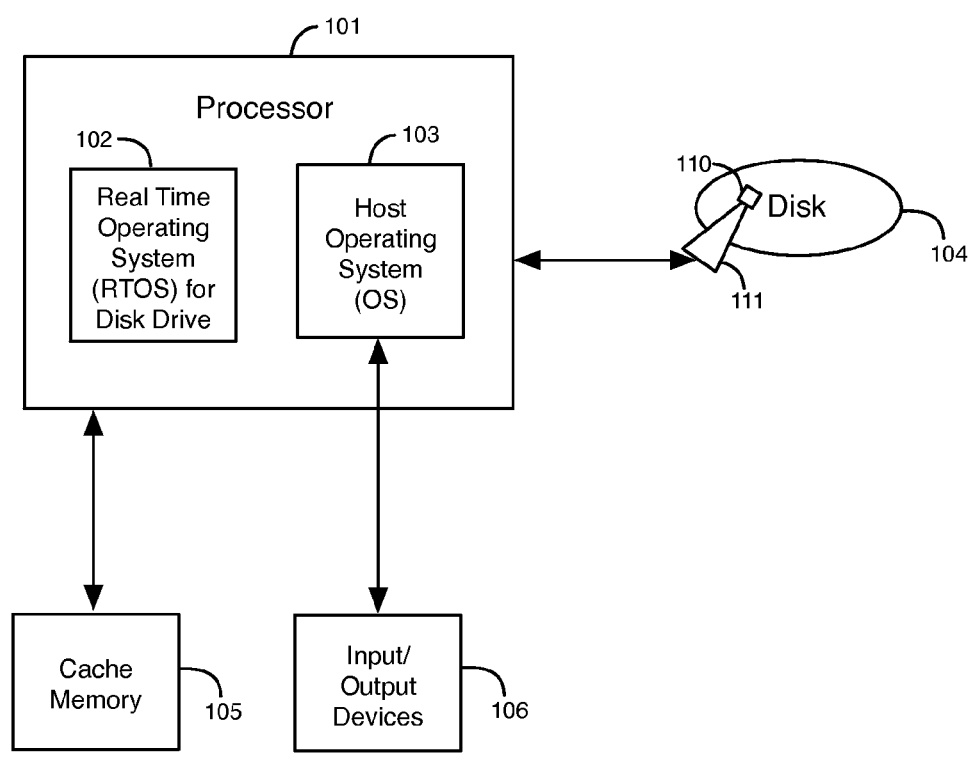
FIG. 1 illustrates a block diagram of an embedded device having a processor that runs a real-time operating system for a disk drive and a host operating system, according to an embodiment of the present invention.

According to some embodiments of the present invention, a real-time operating system (RTOS) for a disk drive and a host operating system (OS) share a processor (e.g., a microprocessor or central processing unit) in a computing system to increase the efficiency of data transfers between the two operating systems. FIG. 1 illustrates an example of an embedded device that contains a shared processor, according to a particular embodiment of the present invention.

The embedded device of FIG. 1 includes a processor 101, a magnetic hard disk 104, a an actuator arm 111, a read/write head 110, cache memory 105, and one or more input/output devices 106, such as a keyboard. Processor 101 runs a real-time operating system (RTOS) 102 for a disk drive and a host operating system (OS) 103. Real-time operating system 102 implements the functions of a disk drive controller, including reading and writing data to and from disk 104. Host OS 103 implements other functions of the embedded device. The host OS can be, for example, Linux, Windows CE, Mac OS X, etc. Host OS 103 interfaces with the input/output devices 106, and processor 101 communicates with cache memory 105.

Figure 2:
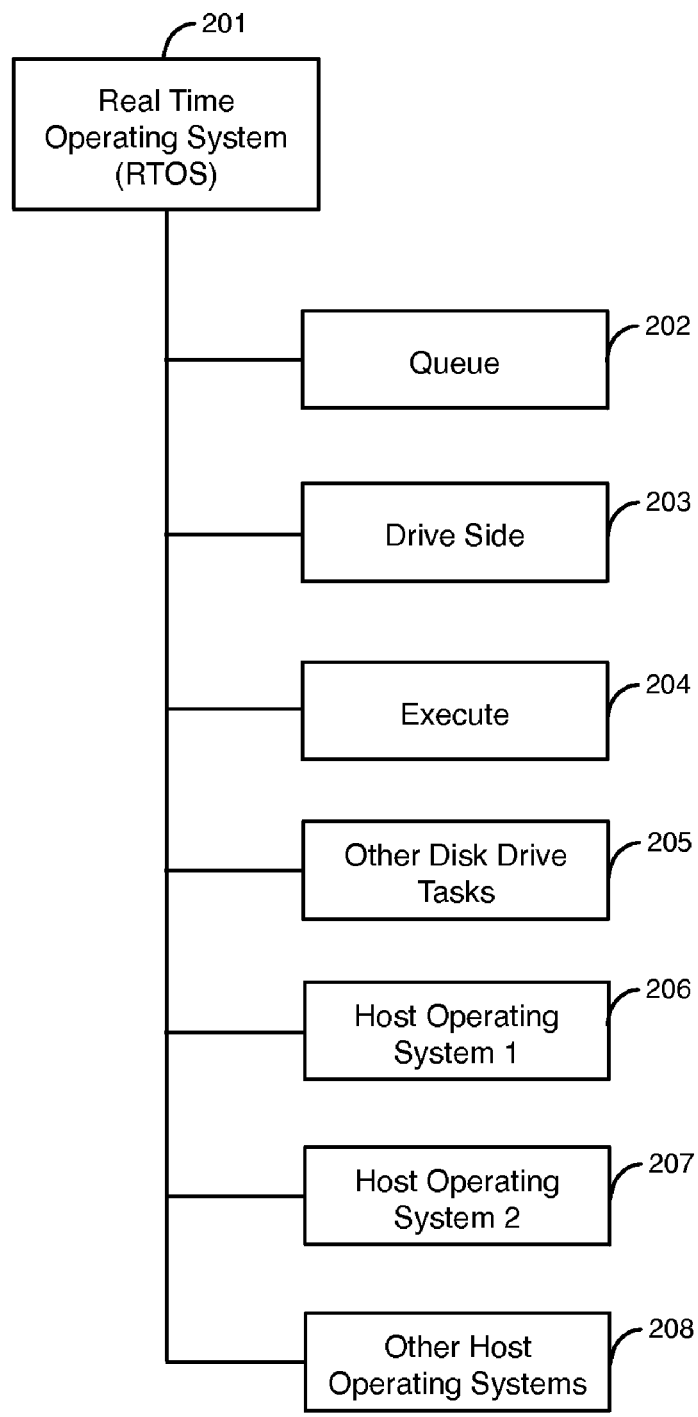
FIG. 2 is a diagram that illustrates task switching for the disk drive and multiple host operating systems that are controlled by a real-time operating system, according to an embodiment of the present invention.

FIG. 2 illustrates task switching for the disk drive and one or more host operating systems that are controlled by a real-time operating system, according to an embodiment of the present invention. A real-time operating system (RTOS) 201 controls task switching in the processor. RTOS 201 can switch between various disk drive task routines for reading and writing data to one or more disks, including queue 202, drive side 203, execute 204, and other disk drive tasks represented by box 205. RTOS 201 can also switch between the disk drive tasks and one or more lower priority tasks that implement one or more host operating systems.

RTOS 201 can switch between tasks that implement multiple host operating system, such as host OS 206, host OS 207, and other host operating systems 208, etc. From the host OS's perspective, the host OS still has complete ownership of the target processor. The RTOS has responsibility for task switching the host OS to maintain the host OS's perspective of control over the target processor.

Figure 3:
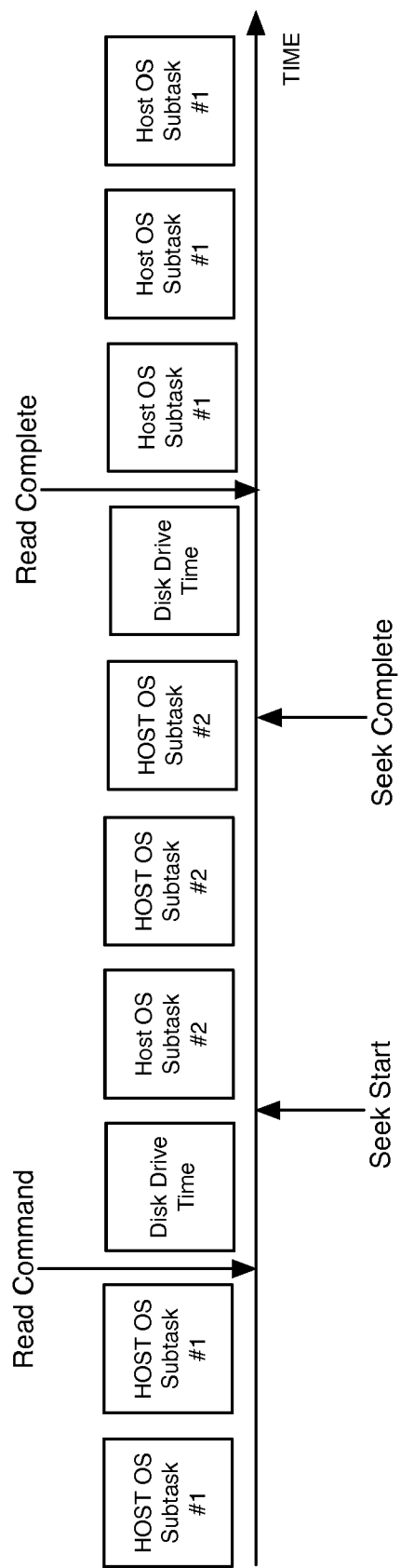
FIG. 3 is a timing graph that illustrates an example of an execution sequence on a processor, according to an embodiment of the present invention.

FIG. 3 is an example of an execution sequence on a processor illustrating how an RTOS can switch tasks that a shared processor performs for a host OS and a disk drive, according to an embodiment of the present invention. In FIG. 3, the shared processor executes subtask #1 for the host OS. Subtask #1 is a subtask of the host OS. When the RTOS issues a read command, the RTOS causes the processor to switch tasks from the host OS to the disk drive. During the disk drive time, the processor executes the tasks needed to begin a seek of the requested data on the disk.

While the seek sequence is being performed, the RTOS causes the processor to switch tasks from the disk drive task to the host OS to process a subtask #2. The processor continues to process subtask #2 for the host OS until the seek sequence is complete. Subsequently, the RTOS causes the processor to switch tasks from the host OS subtask #2 to the disk drive task. During the disk drive time, the processor executes the tasks needed to complete the read sequence. Subsequently, the RTOS causes the processor to switch tasks from the disk drive task back to the host OS subtask #1. Host OS subtasks #1 and #2 are subtasks of a single host OS.

FIG. 3 illustrates that the RTOS can cause a shared processor to suspend a host OS subtask to execute the tasks for a read command. Similarly, the RTOS can cause a shared processor to suspend a host OS subtask to execute the tasks for a write command. FIG. 3 also illustrates that the RTOS can cause a shared processor to execute a host OS subtask, while a disk drive is performing a seek operation to read (or write) data on a disk, thereby increasing processor efficiency.

Figure 4:
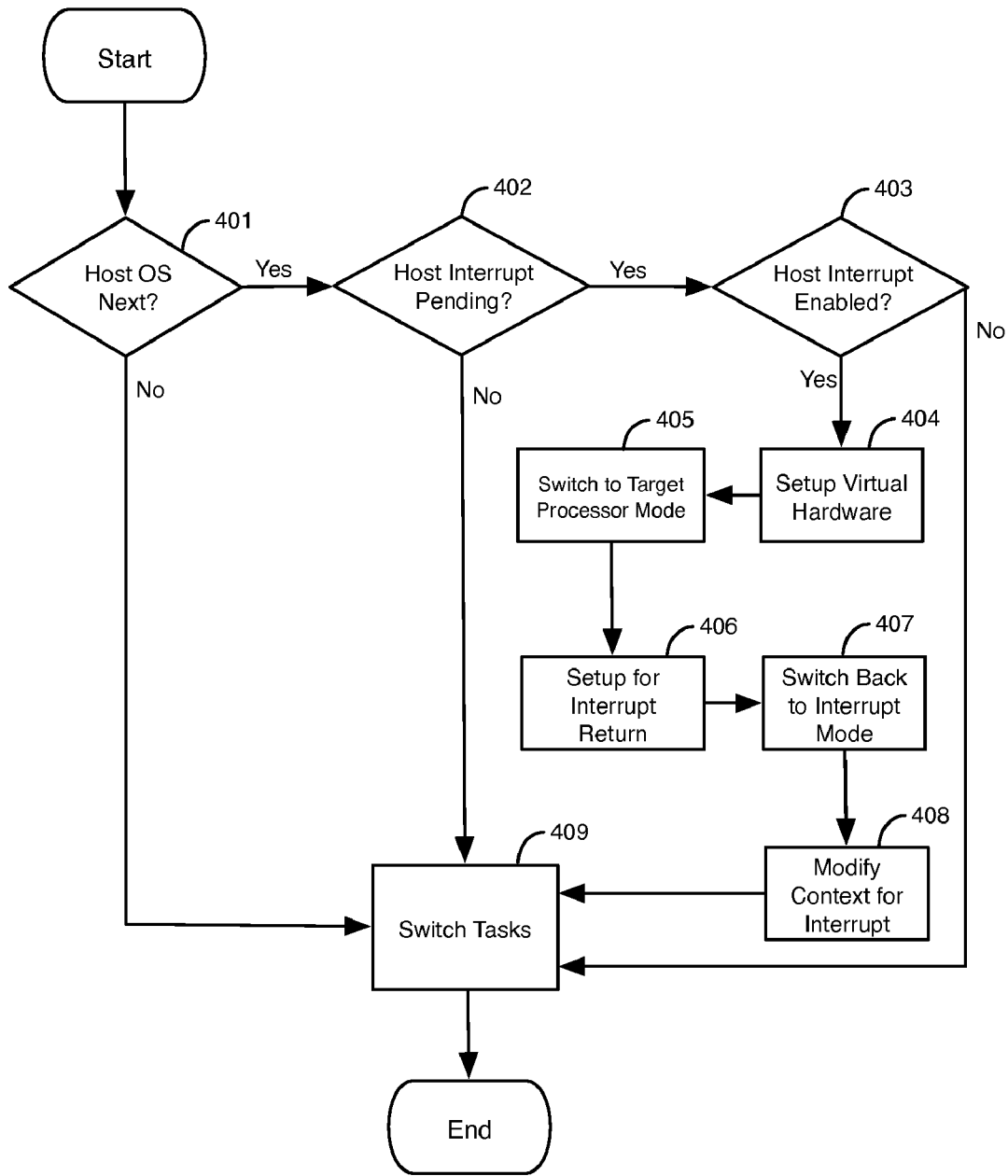
FIG. 4 is a flow chart that illustrates a process for switching tasks through a real-time operating system, according to an embodiment of the present invention.

The disk drive RTOS has the responsibility of task switching the host OS, as well as simulating interrupts in the host OS. These responsibilities facilitate a shared processor that, from the host OS's perspective, is completely owned by the host OS. FIG. 4 illustrates an example of a task switching process that a disk drive RTOS can use to simulate a virtual interrupt area in memory, according to an embodiment of the present invention.

At conditional step 401, no task is currently running. During step 401, the RTOS decides if the task that runs the host OS should execute. This decision is made based on whether there are any higher priority tasks that need to be executed in the RTOS. If the RTOS does not execute the task that runs the host OS, the RTOS switches to another task at step 409. If the RTOS decides to execute the task that runs the host OS, the RTOS determines if an interrupt from the host OS is pending (e.g., in a virtual interrupt area in memory) at conditional step 402. If a host interrupt is not pending, the RTOS switches to another task at step 409.

If a host OS interrupt is pending, the RTOS determines if interrupts are enabled in the host OS at conditional step 403. If host OS interrupts are not enabled, the RTOS switches to another task at step 409. If host OS interrupts are enabled, the RTOS proceeds to set up virtual hardware that simulates interrupts in the host OS at step 404. According to an embodiment of the present invention, the drive controller RTOS can simulate an interrupt in the host OS by switching to the target processor mode at step 405. Target processor mode is an operating mode of the processor.

The RTOS then sets up for an interrupt return at step 406. Setting up for the interrupt return at step 406 involves modifying the registers associated with the target processor mode switched to at step 405 such that execution is started at the correct instruction with the working registers containing the proper data.

Next, the RTOS switches back to interrupt mode at step 407. Interrupt mode refers to execution in one of the interrupt processing modes. Processor-specific examples of interrupt mode on the ARM processor include IRQ and FIQ. These examples of interrupt modes are provided for illustration and are not intended to limit the scope of the present embodiment.

The RTOS then modifies the program counter in the context area of the host OS task at step 408 to reflect the start of interrupt handling code for the interrupt being simulated. After setting up the virtual hardware, the host OS switches to the host OS task at step 409.

Figure 5:
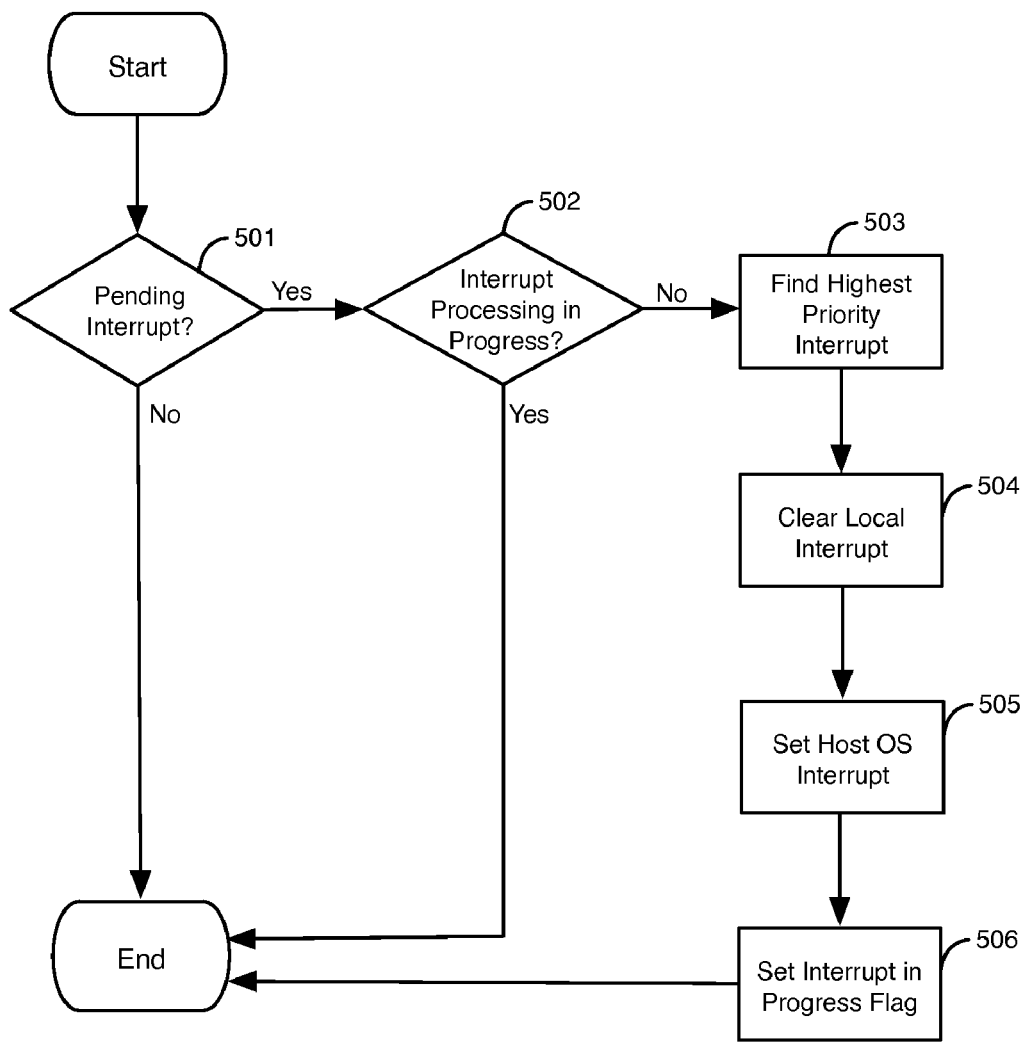
FIG. 5 is a flow chart that illustrates a process for setting up a virtual interrupt in a real-time operating system for simulating interrupts in a host operating system, according to an embodiment of the present invention.

FIG. 5 illustrates an example of a mechanism for setting up a virtual interrupt in the RTOS for simulating the host OS interrupts, according to an embodiment of the present invention. Beginning in conditional step 501, the RTOS determines if there is a pending interrupt. If there is no pending interrupt, the code block ends. If the RTOS detects that there is a pending interrupt, the RTOS determines if there is any interrupt processing in progress at conditional step 502. If interrupt processing is in progress, the code block ends. If there is no interrupt processing in progress, the RTOS determines the highest priority interrupt at step 503. The RTOS then clears the local interrupt at step 504, sets the host OS interrupt at step 505, and sets the interrupt in progress flag to true at step 506.

Figure 6:
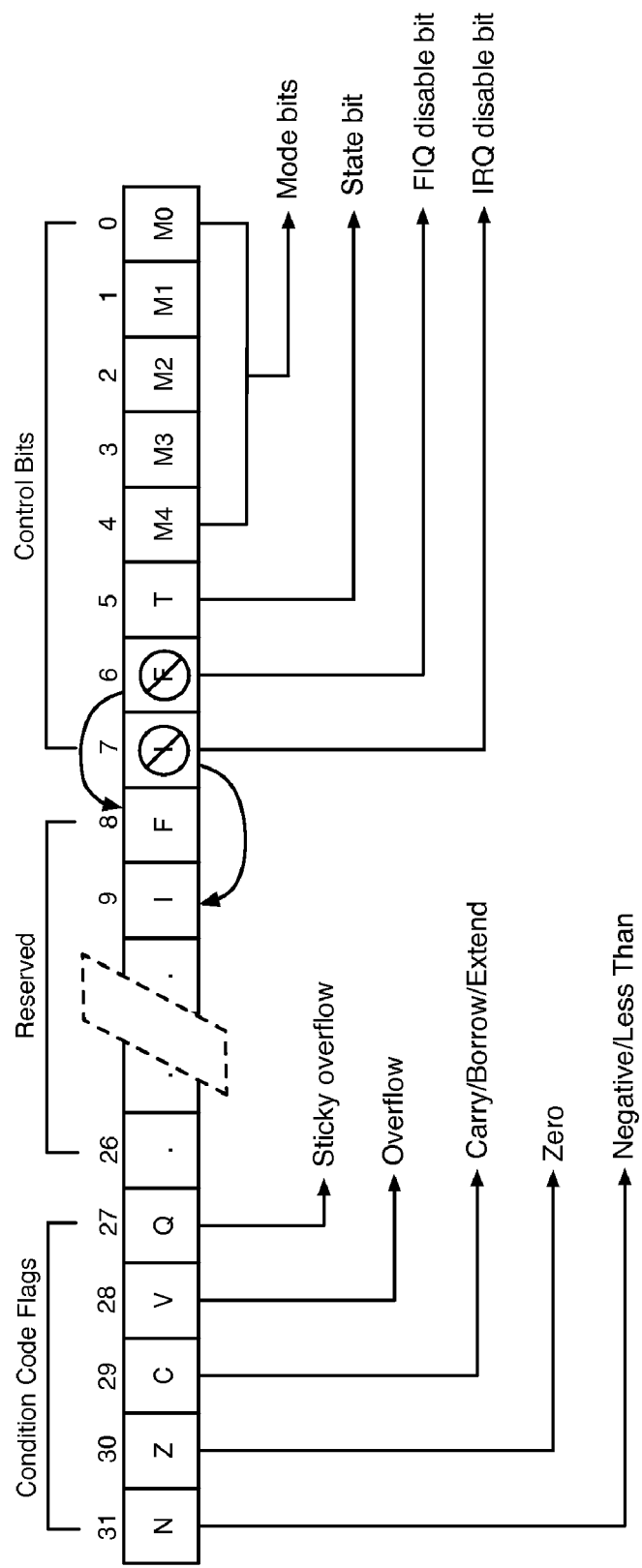
FIG. 6 illustrates an example of an ARM processor status register with interrupt disable bits relocated, according to an embodiment of the present invention.

FIG. 6 illustrates an ARM processor status register with interrupt disable bits relocated. If the host OS was allowed to disable the processor's real interrupts, it could prevent a higher priority task from taking control of the processor. The RTOS can utilize this register to simulate the host OS's ability to enable and disable interrupts in the processor, according to an embodiment of the present invention. This functionality can be realized by moving the bits in locations 6 and 7 for the interrupts in the host OS to an unused portion of the program status register, locations 8 and 9 respectively, and then clearing the bits in locations 6 and 7. The illustration shown in FIG. 6 is specific to the ARM processor's status register, but can vary according to the specific processor architecture in use.

When both the RTOS and the host operating system execute on the same processor, they both have access to all the same peripherals and memories. This shared access provides an additional cost savings, because larger combined memories are cheaper than multiple, smaller memories, due to packaging and PCB real estate costs.

In a traditional two processor system, the host OS sends read and write requests through the drive interface. The present invention uses a mailbox system to provide a faster, more efficient mechanism. From the host OS's point of view, the disk drive is accessed as any normal drive would be. The only change in the system is a custom device driver. The custom device driver invokes a system call to the RTOS to send a read or write request to the disk drive firmware. The received request is processed as a normal request by the disk drive firmware, except for the data transfer. The disk drive firmware passes a pointer to a buffer that the disk drive firmware writes to or reads from depending on the command type. The custom device driver can read data from or write data to the buffer using the pointer to transfer data to and from the host OS. This process eliminates the data transfer that would normally occur over a drive interface, greatly improving performance. As part of the system call, the request is placed in the drive's receive queue.

The Disk Drive Accesses and Responds to Metadata about the Underlying File System Operating systems typically organize data into a logical file system. When these files are written onto a disk, metadata that describes the files are stored with the data on the disk. The file metadata can include, for example, the file size, the file type, file permissions, and the last access time.

According to another embodiment of the present invention, a disk drive can access file metadata that describes the user data stored on a disk. The disk drive can use this file metadata to implement optimizations of the read and write requests from a host operating system. A disk drive is not limited to using the Logical Block Address (LBA) information about the data. The file metadata can provide the disk drive with knowledge about more user data than is provided by an LBA alone.

The present invention allows a disk drive to implement performance and prioritization optimizations at the file system level using file metadata. The optimizations can be provided, for example, through a standard block interface, or through a shared processor running a host OS and a disk drive OS with or without a shared memory area.

This embodiment of the present invention works with encrypted files. The disk drive device does not need to decrypt the data to function.

A system according to this embodiment of the present invention can be implemented by having the storage device's firmware mount the file system resident on the disk for read-only access. This embodiment can be achieved by writing custom code for each file system, or by running a host OS process in the disk drive controller, such as a version of Linux.

The capability to mount file systems is normally reserved for a host OS. This embodiment of the present invention allows for a disk drive to mount file systems resident on a hard disk, for purposes of internal buffer optimization, Rotational Positional Optimization (RPO), and other optimizations. A disk drive that is aware of file system metadata can, for example, utilize the hardware most effectively with respect to the requests being made, for example, in a server environment or Home Theater Personal Computer (HTPC) where many concurrent read/write streams can be expected. Both of these environments can be better served by the superior data transfer characteristics of the present invention.

Several modes of operation can allow optimization of LBA read/write requests from a host OS, such as the prioritization of requests. As the host OS sends requests for data to be read from and written to the disk, the disk drive translates LBAs for the read/write requests into file destinations. The file metadata is interpreted, and an appropriate optimization is devised. For example, the disk drive can determine when and where to read ahead data stored on the disk to service a subsequent request using the Rotational Position Optimization (RPO) and the file system metadata. As another example, the disk drive can perform write commands for subsequent write requests using the file system metadata.

The file system metadata can contain information such as file type, file size, last access time, and a physical location that the disk drive can use to prioritize requests and to select which of the subsequent requests to read ahead or write ahead. For example, a disk drive can use the file system metadata to prioritize the access of video files or audio files over other lower priority files. These examples of the file system metadata are not intended to limit the types of file system metadata that can be utilized by a disk drive to perform the optimizations.

According to another embodiment, the appropriate optimization performed by the disk drive can be discerned from a file name. For example, if the access is a read, and the file is identified as a video file by its filename extension or Magic number, the disk drive can allocate an internal buffer that is larger than normal. Once the buffer is allocated, the read begins, while the rest of the block-to-file translation is completed. In this case, an LBA-to-file translation is used to implement a file read-ahead.

While a read request is being serviced, the disk drive can choose to read data from the disk that corresponds to a different read request using the file system metadata. The ability to service subsequent read requests can be achieved by positional and rotational efficiencies when moving read/write heads across the platter surfaces, or it can be achieved by prioritization of the content specified by the file type. The present invention is not limited to the foregoing optimizations.

A disk drive of the present invention has the ability to read ahead (and write ahead) sequential and non-sequential logical block addresses. While a current request is being serviced, an embodiment of the present invention can allow subsequent read and write requests to result in a cache hit, because the disk drive has already utilized file system metadata to read and write data in response to subsequent read/write requests, greatly increasing performance. By accessing data stored in cache memory when available, a greater number of simultaneous streams can be serviced at one time, or higher bandwidth streams, such as High Definition audio and video, can be enabled.

In the case of the write of a video file, the disk drive can decide to physically spread the LBAs across the disk using file metadata in a way that increases the guaranteed bandwidth to the current and subsequent data streams. The LBAs can be spread across the disk in patterns that even out the differences in data transfer rates between the inner and outer diameters of the disk. In the case of writing a small configuration file, the disk drive can decide to write the data to internal cache before writing the file to disk if higher priority data streams have precedence, for example. The disk drive can then write the small configuration file to disk when the write head is in an optimal position.

A storage device of the present invention is able to provide a level of performance far beyond those implemented at the system level, because the device has knowledge of its own internal geometries. The device can perform file read-ahead in a multi-stream environment using file metadata to read the maximum amount of data prior to the next seek operation requiring movement of the heads. The device can also perform read-ahead operations on subsequent requests through RPO (Rotational Position Optimization). System-level solutions have no such knowledge.

Another mode of operation can identify requests on writes, placing real-time files in a separate region of the hard disk from non-real-time files. This aspect of the invention can greatly accelerate the read side, using a simple range check that examines the incoming LBA from the request to determine if the read request falls within the separate real-time region defined above.

According to another embodiment, a standard block write can be relocated on a file basis during idle mode using file system metadata. The embodiments described herein are several examples of operating modes that are provided to illustrate the principles of the present invention and are not intended to limit the scope of the present invention.

Figure 7:
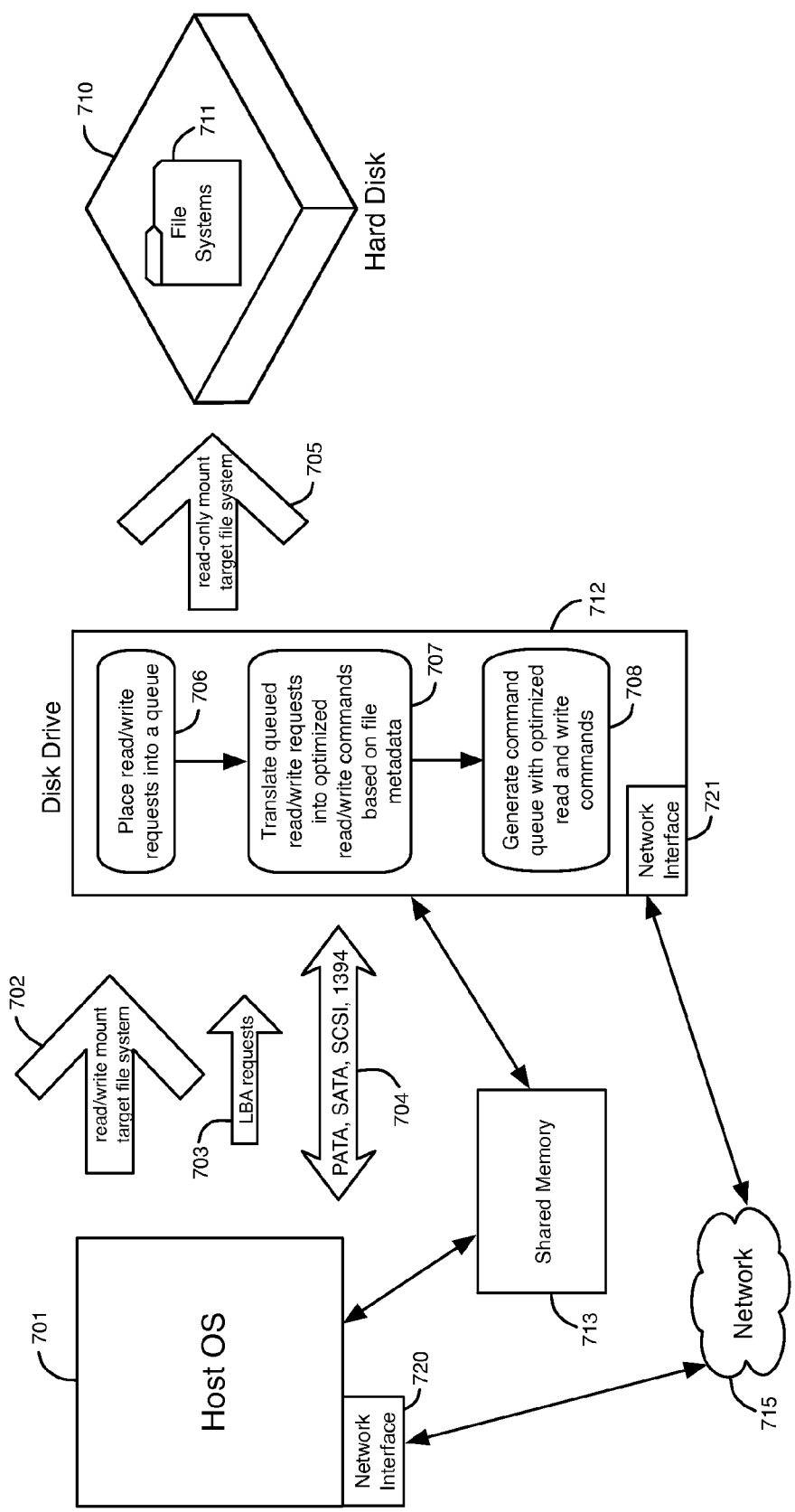
FIG. 7 illustrates an example of a disk drive that translates host OS commands into optimized commands using file metadata, according to an embodiment of the present invention.

FIG. 7 illustrates the interpretation and translation of host OS read/write requests to a disk drive operating system for the purpose of optimizing hard disk drive performance, according to an embodiment of the present invention. A host OS 701, such as Linux or Microsoft Windows, in the normal course of operation, mounts one or more file systems 711 in a read/write mode, at step 702, on a storage device such as a hard disk 710. A host OS, in the normal course of operation, issues many read/write requests, as shown by step 703, to a disk drive 712. Disk drive 712 includes a disk drive operating system. This communication between the host OS 701, and the disk drive 712, normally occurs over a standard data bus interface 704, such as PATA (Parallel-ATA), SATA (Serial-ATA), SCSI (Small Computer System Interface), or IEEE-1394, commonly known as Firewire.

Alternatively, disk drive 712 can communicate with host OS 701 through network 715 using similar network interfaces 720 and 721 (e.g., Ethernet interfaces). Disk drive 712 can also communicate with other host operating systems (not shown) through network 715.

Step 705 illustrates disk drive 712 mounting a target file system in read-only mode. After mounting the target file system in read-only mode, the disk drive is able to access the metadata in the file system and use the metadata to optimize read/write requests.

The process begins executing at step 706 by placing incoming read/write requests into a queue. At step 707, the queued read/write requests are translated into optimized read/write commands for the hardware based on file metadata. Optimized read/write commands include read and write commands that are prioritized based on the file metadata and RPO.

After performing steps 706 and 707, disk drive 712 generates a command queue containing the optimized read/write commands for a disk drive at step 708. For example, the disk drive can optimize the read requests by allocating a larger buffer than normal in the case of a data stream requiring real-time performance characteristics. Based on knowledge of the underlying file system and RPO, the disk drive can serve read requests out-of-order or combine different read requests to maximize data transfer of one or more files, and minimize the amount of physical movement needed for the heads to locate the next data block. The disk drive can perform many other read request optimizations such as the optimizations described above.

As another example, a disk drive can optimize write requests based on the file's real-time status. The disk drive can also optimize write requests with knowledge of the underlying file system and RPO, so that a data stream can be written to cache or to an area of contiguous free space on the hard disk, thereby enhancing a subsequent seek operation. The disk drive can perform many other write request optimizations such as the optimizations described above. The present invention is not limited by the variables that can be used to translate host OS read/write requests into prioritized and optimized commands for a block storage device.

Box 713 illustrates a shared memory that can be used by both the disk drive OS and the host OS for the passing of data. The shared memory area 713 can be a shared memory area in a processor that is shared by the host OS and the disk drive OS, according to the shared processor embodiments described above. In the shared processor embodiments, the shared memory area 713 has superior data transfer performance characteristics as compared to the normal interfaces 704 used to connect block devices. Alternatively, shared memory area 713 can be a memory device accessible by a disk drive controller and separate processor running a host OS.

As the disk drive 712 executes an optimized command queue 708, data can be written directly to the shared memory area 713. The disk drive 712 can pass a pointer to a memory location in the shared memory area 713. The host OS can quickly access the data using the pointer provided by the disk drive. A host OS can benefit greatly from the low latency data transfer characteristics of this shared memory.

The foregoing description of the exemplary embodiments of the invention has been presented for the purposes of illustration and description. It is not intended to be exhaustive or to limit the invention to the precise form disclosed. A latitude of modification, various changes, and substitutions are intended in the present invention. In some instances, features of the invention can be employed without a corresponding use of other features as set forth. Many modifications and variations are possible in light of the above teachings, without departing from the scope of the invention. It is intended that the scope of the invention be limited not with this detailed description.

The invention claimed is:

1. A hard disk drive, comprising:
a processor running a disk drive operating system and a first host operating system (OS), wherein the disk drive operating system is configured to execute tasks for reading and writing data to a disk in response to read and write requests from the first host OS,
wherein the first host OS is executed as a task in the disk drive operating system, and wherein the disk drive operating system simulates enabling and disabling of interrupts for the first host OS by moving interrupt bits for the first host OS from first storage locations in a processor status register to second storage locations in the processor status register.

2. The hard disk drive defined in claim 1 wherein first and second subtasks are subtasks of the first host OS, wherein the disk drive operating system causes the processor to switch tasks from the first subtask to a disk drive task of the hard disk drive when a read command is issued, and wherein the disk drive operating system causes the processor to switch tasks from the disk drive task to the second subtask while a seek sequence for the read command is performed.

3. The hard disk drive defined in claim 2 wherein the processor continues to process the second subtask for the first host OS until the seek sequence is complete, and then the disk drive operating system causes the processor to switch tasks from the second subtask to the disk drive task.

4. The hard disk drive defined in claim 1 wherein the disk drive operating system executes the first host OS task as a lower priority task relative to the tasks for implementing the read and write requests.

5. The hard disk drive defined in claim 1 wherein the disk drive operating system is a real-time operating system.

6. The hard disk drive defined in claim 5 wherein the hard disk drive is part of an embedded device.

7. The hard disk drive defined in claim 1 wherein the first host OS executes a custom device driver that passes a pointer to a buffer where the custom device driver reads and writes data in response to the read and write requests.

8. The hard disk drive defined in claim 1 wherein a second host OS is executed as a task in the disk drive operating system.

9. A method for implementing a hard disk drive, the method comprising:
executing tasks for reading and writing data to a disk using a disk drive operating system in response to read and write requests from a first host operating system (OS), wherein a processor in the hard disk drive runs the disk drive operating system and the first host OS;
executing the first host OS as a task in the disk drive operating system; and
simulating enabling and disabling of interrupts for the first host OS using the disk drive operating system by moving interrupt bits for the first host OS from first storage locations in a processor status register to second storage locations in the processor status register.

10. The method defined in claim 9 wherein the method further comprises:
executing a second host OS as a task in the disk drive operating system.

11. The method defined in claim 9 wherein the method further comprises:
switching tasks in the processor from a first subtask of the first host OS to a disk drive task when a read command is issued in response to the disk drive operating system; and
switching tasks in the processor from the disk drive task to a second subtask of the first host OS while a seek sequence is performed in response to the disk drive operating system.

12. The method defined in claim 9 wherein the method further comprises:
sharing a memory space wherein the first host OS executes a custom device driver that passes a pointer to a location within the memory space where the custom device driver reads and writes data in response to the read and write requests.

13. The method defined in claim 9 wherein executing the first host OS as the task in the disk drive operating system further comprises:
setting up virtual hardware that simulates interrupts in the first host OS;
switching to a target processor mode;
setting up for an interrupt return;
switching to an interrupt mode; and
modifying a program counter in a context area of the first host OS task.

14. A hard disk drive, comprising:
a processor running a disk drive operating system that is configured to read and write data to a disk in response to read and write requests from a host operating system (OS); and
a shared memory accessible by the disk drive operating system and the host operating system for storing data in response to the read and write requests,
wherein the disk drive operating system simulates enabling and disabling of interrupts for the host OS by moving interrupt bits for the host OS from first storage locations in a processor status register to second storage locations in the processor status register.

15. The hard disk drive defined in claim 14 wherein the shared memory is part of an integrated circuit that includes the processor, and the host OS is run on the processor.

16. The hard disk drive defined in claim 14 wherein first and second subtasks are subtasks of the host OS, wherein the disk drive operating system causes the processor to switch tasks from the first subtask to a disk drive task when a read command is issued, and wherein the disk drive operating system causes the processor to switch tasks from the disk drive task to the second subtask while a seek sequence is performed.

* * * * *